United States Patent
Kim et al.

(10) Patent No.: US 12,049,562 B2
(45) Date of Patent: Jul. 30, 2024

(54) HARD COATING COMPOSITION AND WINDOW MEMBER

(71) Applicants: Samsung Display Co., LTD., Yongin-si (KR); Sogang University Research & Business Development Foundation, Seoul (KR)

(72) Inventors: Kyungtae Kim, Hwaseong-si (KR); Bong Jin Moon, Goyang-si (KR); Ji Hyun Bang, Seoul (KR); Sang-Il Park, Yongin-si (KR); Sungguk An, Suwon-si (KR)

(73) Assignees: SAMSUNG DISPLAY CO., LTD., Gyeonggi-Do (KR); SOGANG UNIVERSITY RESEARCH & BUSINESS DEVELOPMENT FOUNDATION, Seoul (KR)

( * ) Notice: Subject to any disclaimer, the term of this patent is extended or adjusted under 35 U.S.C. 154(b) by 0 days.

(21) Appl. No.: 18/065,191

(22) Filed: Dec. 13, 2022

(65) Prior Publication Data
US 2023/0250279 A1    Aug. 10, 2023

(30) Foreign Application Priority Data
Jan. 4, 2022    (KR) .......... 10-2022-0001004

(51) Int. Cl.
*C08L 75/08* (2006.01)
*C08L 63/00* (2006.01)
*C09D 163/00* (2006.01)
*C09D 175/08* (2006.01)

(52) U.S. Cl.
CPC .............. *C08L 75/08* (2013.01); *C08L 63/00* (2013.01); *C09D 163/00* (2013.01); *C09D 175/08* (2013.01)

(58) Field of Classification Search
CPC ........ C08G 18/6279; C08G 2261/3324; C08G 2261/418; C08G 2261/76; C08G 61/08; C08L 33/04–12; C08L 63/00–10; C08L 75/04–16; C08L 43/00; C09D 163/00–10; C09D 175/04–16
See application file for complete search history.

(56) References Cited

FOREIGN PATENT DOCUMENTS

| | | |
|---|---|---|
| JP | 2019085450 A | 6/2019 |
| JP | 2019085451 A | 6/2019 |
| WO | 2005028402 A2 | 3/2005 |

OTHER PUBLICATIONS

Cuiping Zhou, et al., Low Ice Adhesion Surfaces Based on Flexible Fluorinated Polymerswith a Polynorbomnene Backbone, ACS Appl. Mater. Interfaces 2020, 12, 53494-53502.
English Abstract of JP 2019085450.
English Abstract of JP 2019085451.
Kaiqiang Zhang, et al., UV-curable POSS-fluorinated methacrylate diblock copolymers foricephobic coatings, Progress in Organic Coatings 93 (2016) 87-96.
Tomoya Sato, et al., Simple and Scalable Protocol for Producing Hydrophobic PolymerBrushes Beyond Wafer-Scale Dimensions toward Real-LifeApplications, ACS Appl. Polym. Mater. 2021, 3, 1395-1405.

*Primary Examiner* — Ana L. Woodward
(74) *Attorney, Agent, or Firm* — CANTOR COLBURN LLP

(57) ABSTRACT

A hard coating composition includes a norbornene-based compound represented by a Chemical Formula 1 and a polymer including at least one of an epoxy-based resin, a polyurethane-based resin, or an acrylic resin.

21 Claims, 4 Drawing Sheets

<EXAMPLE 14>

<EXAMPLE 15>

<EXAMPLE 17>

<EXAMPLE 23>

HARD COATING COMPOSITION AND WINDOW MEMBER

CROSS-REFERENCE TO RELATED APPLICATION

This application claims priority to Korean Patent Application No. 10-2022-0001004, filed on Jan. 4, 2022 in the Korean Patent Office, and all the benefits accruing therefrom under 35 U.S.C § 119, the content which in its entirety is herein incorporated by reference.

BACKGROUND

1. Field

Embodiments relate to a hard coating composition, and a window member including a hard coating layer that is formed using the hard coating composition.

2. Description of the Related Art

Various types of display devices are used to provide image information. The display device may include a display panel for displaying an image and a window member for protecting the display panel. For example, the display panel may include an organic light emitting display panel, a liquid crystal display panel, or the like. A user sees the image displayed on the display panel through the window member.

Meanwhile, the window member may include various layers to improve durability and prevent fingerprints. For example, the window member may include a base member and a hard coating layer disposed on the base member. The hard coating layer may serve to improve durability such as hardness of the base member.

SUMMARY

Embodiment provides a hard coating composition for forming a hard coating layer.

Embodiment provides a window member including the hard coating layer formed using the hard coating composition.

A hard coating composition according to embodiments may include a norbornene-based compound represented by Chemical Formula 1 and a polymer including at least one of an epoxy-based resin, a polyurethane-based resin, or an acrylic resin. In Chemical Formula 1, A may represent an ester group, an ether group, an amide group, or an alkyl group, $R_x$ may represent a fluoroalkyl group or a fluoropolyether group, $R_y$ may represent an alkyl group having a crosslinkable functional group, and each of n and m may be independently about 1 to about 100.

Chemical Formula 1

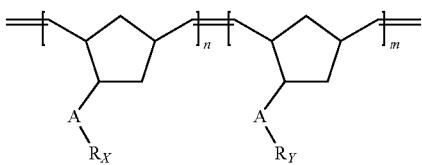

In an embodiment, the norbornene-based compound may be a block copolymer or a random copolymer.

In an embodiment, the norbornene-based compound may have a bottle-brush polymer structure as this term is understood in the polymer art.

In an embodiment, the norbornene-based compound may be a product of a ring opening metathesis polymerization (ROMP) of a first monomer having a crosslinkable functional group and a second monomer having a fluoroalkyl group.

In an embodiment, the crosslinkable functional group may be a hydroxyl group, an epoxy group, an acrylate group, or a (meth)acrylate group.

In an embodiment, the fluoroalkyl group may be 1H,1H,2H,2H-heptadecafluorodecyl, 1,1,1,3,3,3-hexafluoroisopropyl, 1H,1H,3H-hexafluorobutyl, 1H,1H,3H-tetrafluoropropyl, 1H,1H,5H-octafluoropentyl, 1H,1H,7H-dodecafluoroheptyl, 1H,1H-heptafluorobutyl, and 2,2,2-trifluoroethyl.

In an embodiment, in the norbornene-based compound, a mole ratio of a first repeating group including Rx to a second repeating group including Ry of Chemical Formula 1 may be about 95:5 to about 50:50, respectively.

In an embodiment, the hard coating composition may further include silica nanoparticles and a solvent if the polymer compound includes a polyurethane-based resin. The silica nanoparticles may be dispersed in a solvent.

In an embodiment, the polyurethane-based resin may include at least one of a polyol or a polyisocyanate.

In an embodiment, the hard coating composition may further include silica nanoparticles, a solvent, a photoacid generator, and a crosslinking agent if the polymer compound includes an epoxy-based resin.

In an embodiment, the epoxy-based resin may include a composite of an organic resin and an inorganic resin.

In an embodiment, the crosslinking agent may have an epoxy group.

In an embodiment, the photoacid generator may have a fluoroalkyl group, e.g., a perfluoroalkyl group.

In an embodiment, the solvent may include at least one of a ketone-based solvent, an ether-based solvent, or an ester-based solvent.

A window member according to embodiments of the present invention may include a based member and a hard coating layer disposed on the base member, the hard coating layer comprising a first layer and second layer disposed on the first layer. The first layer may include a cross-linked structure formed by curing a polymer including at least one of an epoxy-based resin, a polyurethane-based resin, or an acrylic resin. The second layer may include a cross-linked structure formed by curing a norbornene-based compound represented by Chemical Formula 1. In Chemical Formula 1, A may represent an ester group, an ether group, an amide group or an alkyl group, Rx may represent a fluoroalkyl group or a fluoropolyether group, Ry may represent an alkyl group having a crosslinkable functional group, and each of n and m may be independently about 1 to about 100.

Chemical Formula 1

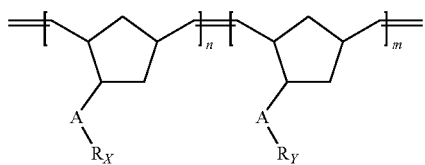

In an embodiment, the first layer may include a surface adjacent to the base member and the second layer may be fixed to an opposite surface of the first layer.

In an embodiment, the norbornene-based compound may be a block copolymer or a random copolymer.

In an embodiment, the norbornene-based compound may be a product of a ring opening metathesis polymerization of a first monomer having a crosslinkable functional group and a second monomer having a fluoroalkyl group. The norbornene-based compound may have a bottle-brush polymer structure.

In an embodiment, the crosslinkable functional group may be a hydroxyl group, an epoxy group, an acrylate group, or a (meth)acrylate group.

In an embodiment, the fluoroalkyl group may be 1H,1H, 2H,2H-heptadecafluorodecyl, 1,1,1,3,3,3-hexafluoroisopropyl, 1H,1H,3H-hexafluorobutyl, 1H,1H,3H-tetrafluoropropyl, 1H,1H,5H-octafluoropentyl, 1H,1H,7H-dodecafluoroheptyl, 1H,1H-heptafluorobutyl, or 2,2,2-trifluoroethyl.

In an embodiment, the base member may include a plastic.

According to embodiments of the present invention, a hard coating layer formed from a hard coating composition including a norbornene-based compound obtained by reacting a norbornene-based monomer having a crosslinkable functional group and a norbornene-based monomer having a fluoroalkyl group may be obtained. Accordingly, anti-fingerprint function of the hard coating layer may be improved.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Figure 1:
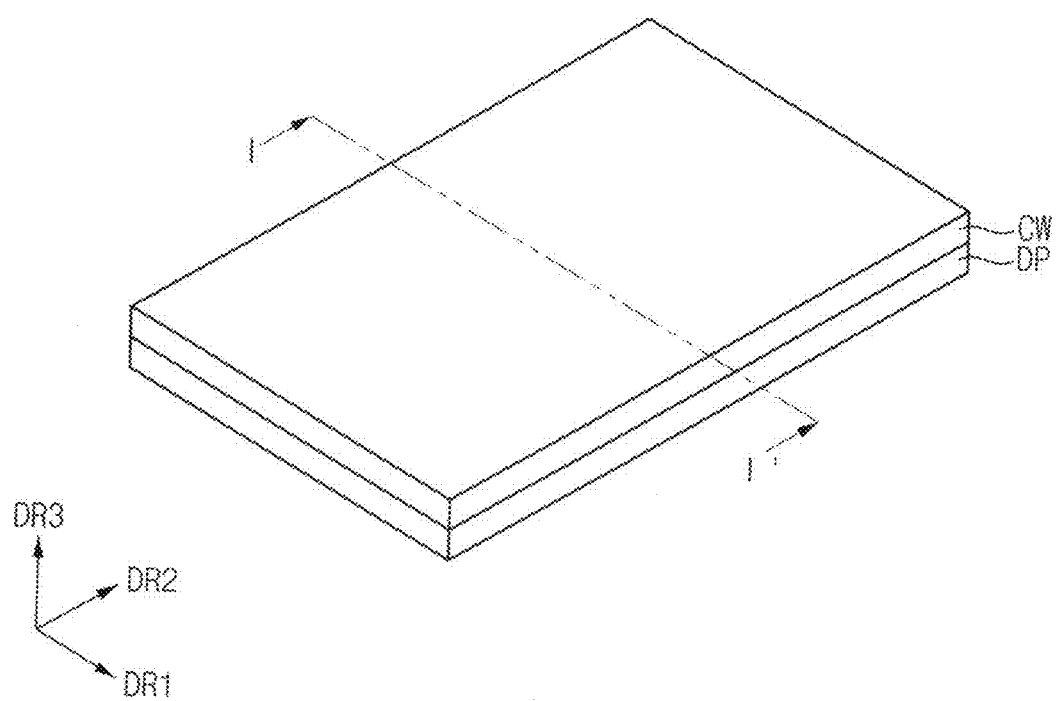
FIG. 1 is a perspective view schematically illustrating a display device including a window member according to an embodiment.

Hereinafter, embodiments of the present disclosure will be explained in detail with reference to the accompanying drawings. The same reference numerals are used for the same components in the drawings, and redundant descriptions of the same components will be omitted.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or ±5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term "fluoroalkyl" refers to an alkyl group in which at least one hydrogen of the alkyl group, e.g., at least two or more hydrogens, three or more hydrogens, or more, are replaced or substituted with a fluorine. The term "perfluoroalkyl" group refers to an alkyl group in which each hydrogen of the alkyl group is replaced or substituted with a fluorine.

The term "compound" refers to compounds with non-repeat units, or an oligomer with a small number of repeat units, e.g., an oligomer with at least one to 20 repeat units, wherein the repeat units can be the same or different, or a polymer with at least 20 repeat units, wherein the repeat units can be the same or different. A person of ordinary skill recognizes and understands that an oligomer is a form of a polymer.

The term "alkyl" refers to a substituted or unsubstituted, branched or linear, non-cyclic monovalent radical including carbon and hydrogen. Optionally, the alkyl group can include one carbon replaced by a heteroatom. The at least one heteroatom may be O, S, N, P, B, Si or Se, preferably, O, S or N. An alkyl group can have 1 to 32 carbon atoms, or 1 to 16 carbon atoms, or 1 to 8 carbon atoms.

The term "alkylene" refers to a substituted or unsubstituted, branched or linear, divalent alkyl radical. Optionally, the divalent alkyl can include one carbon replaced by a heteroatom. The at least one heteroatom may be O, S, N, P, B, Si or Se, preferably, O, S or N. An alkylene group can have 1 to 32 carbon atoms, or 1 to 16 carbon atoms, or 1 to 8 carbon atoms.

The term "-based" refers to a compound that includes the named moiety or is derived from the named moiety. For example, a "polyurethane-based resin" contains repeating urethane groups, and a "norbornene-based compound" is derived from compounds including norbornene groups.

Figure 2:
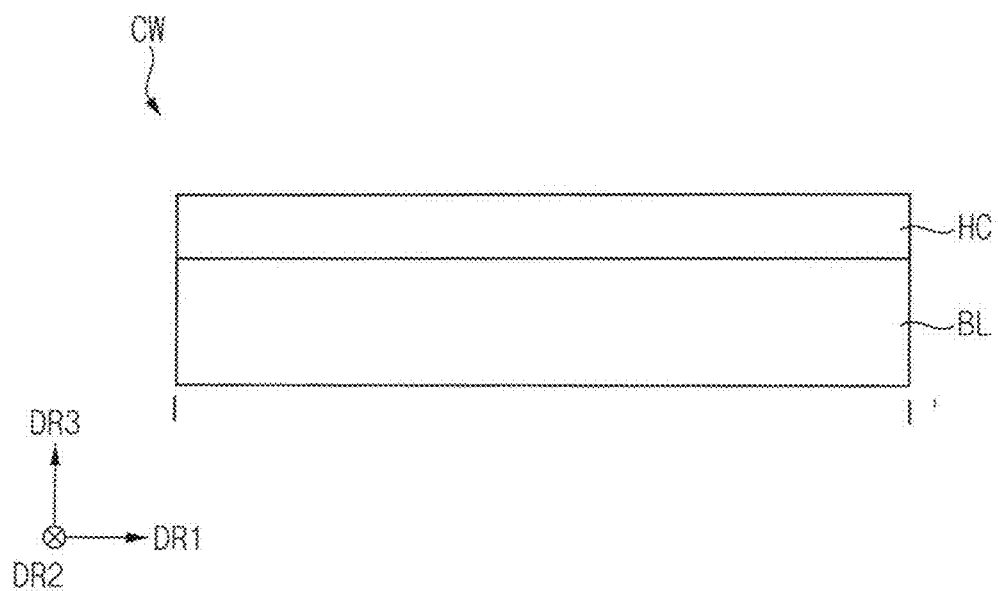
FIGS. 2 and 3 are cross-sectional views illustrating a window member corresponding to a line I-I' of FIG. 1.
Figure 3:
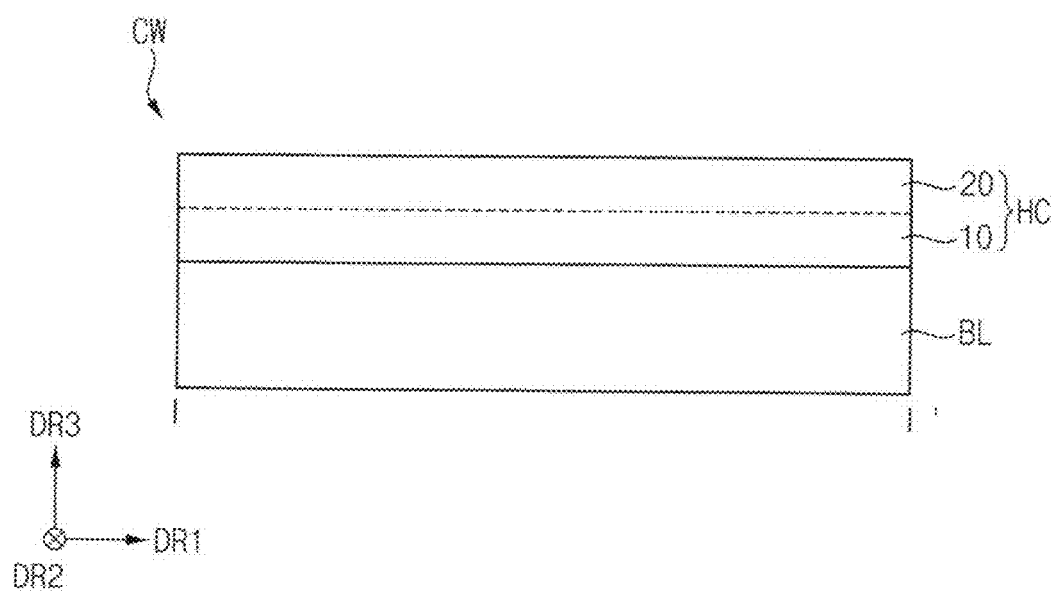

FIG. 1 is a perspective view schematically illustrating a display device including a window member according to an embodiment. FIGS. 2 and 3 are cross-sectional views illustrating a window member corresponding to a line I-I' of FIG. 1.

Referring to FIGS. 1, 2, and 3, a display device may include a display panel DP and a window member CW disposed on the display panel DP. The display panel DP may display an image. For example, in FIG. 1, the display panel DP may provide an image generated in a direction DR3 as a front image side. The display panel DP may include a flexible material. However, the configuration of the present invention is not limited thereto, and the display panel DP may include a rigid material.

The display panel DP may include a driving element, insulating layers, a light emitting element, and the like. The driving element may receive a gate signal and a data voltage to drive the light emitting element. For example, the driving element may include a silicon semiconductor or an oxide semiconductor, and each of the insulating layers may include an organic material or an inorganic material. In addition, the light emitting element may include an organic light emitting element. In this case, the display panel DP may include an organic light emitting display panel.

As described above, the display panel DP may include the organic light emitting display panel. However, the present invention is not limited thereto. For example, the display panel DP includes a liquid crystal display panel, an electrophoretic display panel, a quantum dot display panel, an inorganic light emitting display panel, or the like.

The window member CW may be disposed on the display panel DP. The window member CW may be disposed on the display panel DP to protect the display panel DP. In addition, the window member CW may provide a front surface of the display device to provide an input surface, a touch surface, a display surface, and the like for a user's information input in the display device. For example, the window member CW may include a flexible material.

However, although FIG. 1 illustrates the display device having a flat plane, the present invention is not limited thereto. For example, the display device may include a planar area and at least one curved area. In this case, the display device may be folded based on the curved area.

The window member CW may include a base member BL and a hard coating layer HC disposed on the base member BL. In an embodiment, the base member BL may include a plastic substrate. For example, the base member BL may include polyimide, polyamide, polyethylene, polypropylene, polyacrylate, polycarbonate, and the like. These materials may be used alone or in combination. In another embodiment, the base member BL may include a glass substrate and the like. However, the present invention is not limited thereto, and the base member BL may include other materials.

The hard coating layer HC may be a product of a hard coating composition described herein. In an embodiment, the hard coating composition may include a polymer and a norbornene-based compound. For example, the polymer may include a polyurethane-based resin, an epoxy-based resin, an acrylic resin, and the like. In addition, the norbornene-based compound may include a norbornene-based ester polymer including an oligomer having a crosslinkable functional group, a norbornene-based ester polymer having a fluoroalkyl group, e.g., a perfluoroalkyl group, and the like. Each of these may be used alone or in combination with each other.

As the hard coating layer HC includes the polymer compound, durability of the window member CW may be improved. As the hard coating layer HC includes the norbornene-based compound, the hard coating layer HC may have an anti-fingerprint function. The norbornene-based compound of the hard coating layer HC may perform an additive function.

The hard coating layer HC may be divided into a first layer 10 and a second layer 20 disposed on the first layer 10. In an embodiment, the first layer 10 may include a cross-linked structure formed by curing the polymer compound, and the second layer 20 may include a cross-linked structure formed by curing the norbornene-based compound. For example, the first layer 10 may include a surface adjacent to the base member BL, and the second layer 20 may be fixed to an opposite surface of the first layer 10.

Hereinafter, the hard coating composition for forming the hard coating layer HC will be described in detail.

The Hard Coating Composition

As described above, the hard coating composition may include the polymer and the norbornene-based compound. For example, the polymer compound may include a polyurethane-based resin, an epoxy-based resin, an acrylic resin, and the like. The stated polymers may be used alone or in combination. However, the resin included in the polymer compound is not limited thereto.

In an embodiment, the norbornene-based compound may be represented by Chemical Formula 1.

Chemical Formula 1

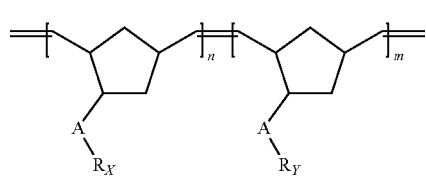

In Chemical Formula 1, A may represent an ester group, an ether group, an amide group, or an alkyl group. In addition, Rx may represent a fluoroalkyl group, e.g., a perfluoroalkyl group or a perfluoropolyether group. Further, Ry may represent an alkyl group having a crosslinkable functional group. In addition, each of n and m may independently be an integer of about 1 to about 1000.

In an embodiment, the crosslinkable functional group may be a hydroxyl group, an epoxy group, an acrylate group, or a (meth)acrylate group. In addition, the fluoroalkyl group may be 1H,1H,2H,2H-heptadecafluorodecyl, 1,1,1,3,3,3-hexafluoroisopropyl, 1H,1H,3H-hexafluorobutyl, 1H,1H,3H-tetrafluoropropyl, 1H,1H,5H-octafluoropentel, 1H,1H,7H-dodecafluoroheptyl, 1H,1H-heptafluorobutyl, or 2,2,2-trifluoroethyl. However, the present invention is not limited thereto.

In an embodiment, the crosslinkable functional group of Ry may be a perfluoroalkyl group.

For example, in the norbornene-based compound, a mole ratio of a first repeating group including Rx to a second repeating group including Ry may be about 95:5 to about 50:50. Preferably, a mole ratio of the first repeating group including Rx to the second repeating group including Ry may be about 90:10 to about 80:20. Accordingly, a surface contact angle of the hard coating layer formed from the hard coating composition is shown to increase with an increase in the mole ratio of the first repeating group including Rx to the second repeating group including Ry.

For example, the Rx may be a fluoroalkyl group represented by Chemical Formula 2-1.

Chemical Formula 2-1

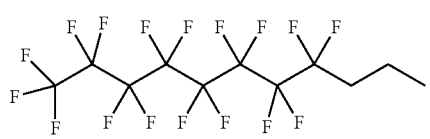

For example, the Ry may be an alkyl group having a hydroxy group represented by Chemical Formula 2-2, an alkyl group having an epoxy group represented by Chemical Formula 2-3, or an alkyl group having an epoxy group represented by Chemical Formula 2-4.

Chemical Formula 2-2

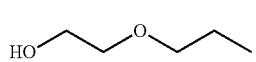

Formula 2-3

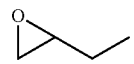

Chemical Formula 2-4

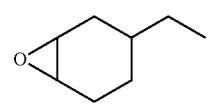

The norbornene-based compound may be obtained by reacting a first monomer having a crosslinkable functional group and a second monomer having a fluoroalkyl group. In an embodiment, the norbornene-based compound may be a product of a ring opening metathesis polymerization (ROMP) of the first monomer and the second monomer. For example, the norbornene-based compound may be obtained by reacting the first monomer and the second monomer under a ROMP catalyst such as a Grubbs catalyst, and as a result, a molecular weight of the norbornene-based compound may be controlled by adjustments in reaction time.

In addition, using synthetic processes well known in the art the norbornene-based compound may be a block copolymer or a random copolymer according to an order of addition of the first monomer and the second monomer during polymerization.

The norbornene-based compound may have a bottle-brush polymer structure. Accordingly, the fluidity of the norbornene-based compound included in the hard coating composition may be increased.

When the polymer compound includes a polyurethane-based resin, the hard coating composition may further include silica nanoparticles, e.g., silica nanoparticles dispersed in a solvent. For example, the polyurethane-based resin may include polyol, polyisocyanate, and the like. The polyurethane-based resins may be used alone or in combination. For example, when the polymer compound includes the polyurethane-based resin, the hard coating composition may have a cross-linked structure that is cured by heat.

When the polymer compound includes an epoxy resin, the hard coating composition may further include silica nanoparticles, e.g., silica nanoparticles dispersed in a solvent, a photoacid generator, and a crosslinking agent. For example, the epoxy-based resin may include a composite in which an organic resin and an inorganic resin are combined. For example, the epoxy-based resin may include an epoxy hybrimer.

The photoacid generator may have a perfluoroalkyl group. For example, the photoacid generator may include triphenylsulfonium perfluorobutanesulfonate, triphenylsulfonium perfluorooctanesulfonate, and the like. These may be used alone or in combination.

The crosslinking agent may include an epoxy crosslinking agent or an acrylate crosslinking agent. Preferably, the crosslinking agent may include an epoxy crosslinking agent. For example, the epoxy crosslinking agent may include two or more epoxy groups. For example, the epoxy crosslinking agent may include 4-vinylcyclohexene dioxide, cyclohexene vinyl monoxide, (3,4-epoxycyclohexane)methyl, 3,4-epoxycyclohexylcarboxylate, 3,4-epoxycyclohexyl methyl methacrylate, bis(3,4-epoxycyclohexylmethyl)adipate, 3,4-epoxycyclohexanecarboxylate, and 2-(3,4-epoxycyclohexyl)-1,3-dioxolane. These may be used alone or in combination.

The solvent may include a ketone-based solvent, an ether-based solvent, or an ester-based solvent. For example, the ketone-based solvent may include methyl ethyl ketone, acetophenone, cyclopentanone, ethyl isopropyl ketone, 2-hexanone, isophorone, mesityl oxide, methyl isobutyl ketone, 3-methyl-2-pentanone, 2-pentanone, 3-pentanone, and the like. The ether-based solvent may include cyclopentyl methyl ether (CPME), diethylene glycol diethyl ether, dimethoxymethane, methyl tert-butyl ether, 2-(2-methoxyethoxy)ethanol, propylene glycol ether, and the like. The ester-based solvent may include propylene glycol monomethyl ether acetate (PGMEA), propylene glycol monoethyl ether acetate, ethyl lactate, and the like. Each of these may be used alone or in combination.

Figure 4:
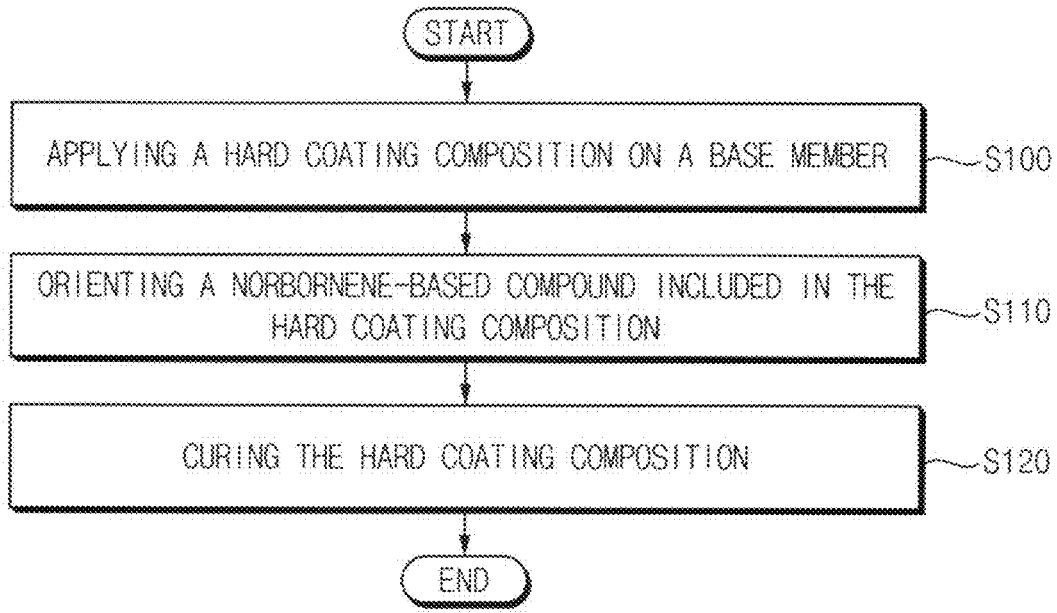
FIG. 4 is a flowchart illustrating an example of a method of manufacturing the window member of FIG. 1.

FIG. 4 is a flowchart illustrating an example of a method of manufacturing the window member of FIG. 1. For example, FIG. 4 illustrates an example of a method of manufacturing the window member if the polymer of the hard coating composition includes a polyurethane-based resin.

Referring to FIGS. 2, 3 and 4, the method of manufacturing the window member may include a step S100 of applying the hard coating composition on the base member BL, a step S110 of orienting the norbornene-based compound included in the hard coating composition, and a step S120 of curing the hard coating composition.

In the step S100 of applying the hard coating composition on the base member BL, the hard coating composition may be applied by a method such as spin coating, slit coating, bar coating, spray coating, inkjet printing, or the like. However, the present invention is not limited thereto, and the hard coating composition may be applied by other methods.

As described above, the composition for a hard coating may include the polymer and the norbornene-based compound. The polymer and the norbornene-based compound may be mixed.

In the step S110 of orienting the norbornene-based compound included in the hard coating composition, the hard coating composition applied on the base member BL and a solvent may be positioned within a vacuum chamber. Then, as a solvent is slowly added to the applied coating, e.g., by vapor diffusion, the norbornene-based compound may separate from the polymer and float atop the polymer. That is, the norbornene-based compound may become oriented in a particular direction, e.g., in a perpendicular direction, to the polymer. For example, the solvent may include a fluorine-based solvent. However, the step S110 of orienting the norbornene-based compound using the solvent is optional, that is, step S110 may be omitted.

In the step S120 of curing the hard coating composition, the hard coating composition may be cured by heating the applied coating composition. In this case, the second layer 20 including the crosslinked structure formed by crosslinking the norbornene-based compound may be fixed to the first layer 10 including the crosslinked structure formed by crosslinking the polymer. Accordingly, the hard coating layer HC including the polymer and the norbornene-based compound may be formed on the base member BL. That is, the window member CW including the base member BL and the hard coating layer HC may be manufactured through the method of manufacturing the window member illustrated in FIG. 4.

Figure 5:
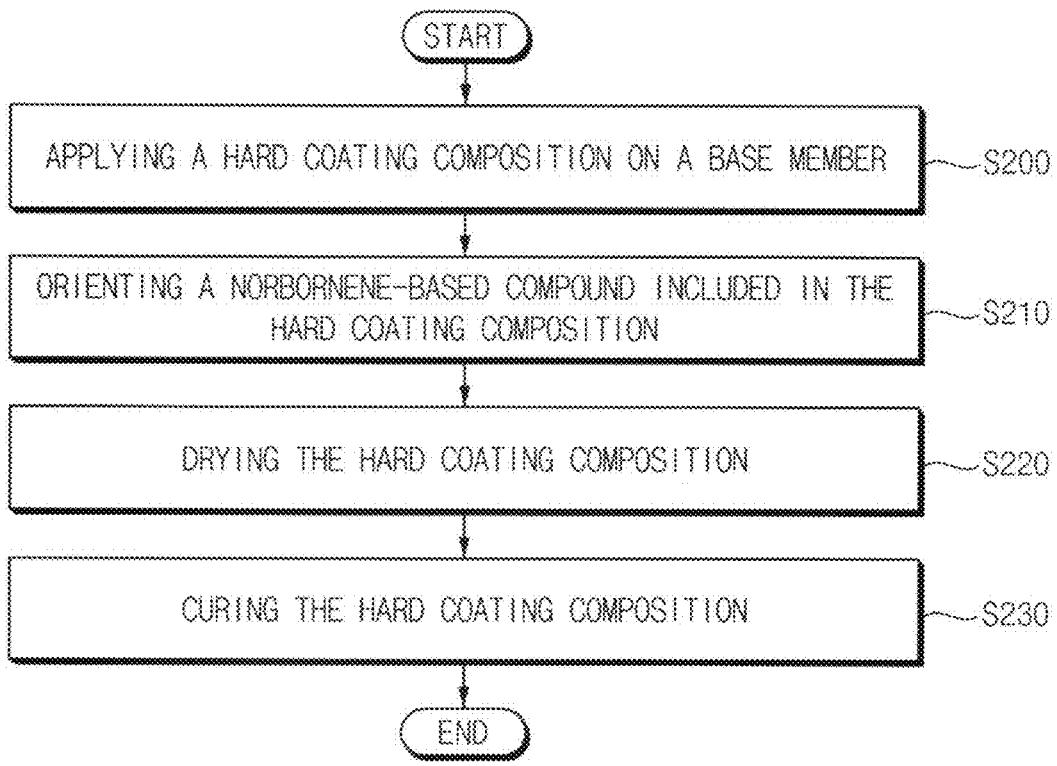
FIG. 5 is a flowchart illustrating another example of a method of manufacturing the window member of FIG. 1.

FIG. 5 is a flowchart illustrating another example of a method of manufacturing the window member of FIG. 1. For example, FIG. 5 illustrates another example of a method of manufacturing the window member if the polymer of the hard coating composition includes the epoxy-based resin.

Referring to FIGS. 2, 3 and 5, the method for manufacturing the window member may include a step S200 of applying the hard coating composition on the base member BL, a step S210 of orienting the norbornene-based compound included in the hard coating composition, a step S220 of drying the hard coating composition, and a step S230 of curing the hard coating composition.

In the step S200 of applying the hard coating composition on the base member BL, the hard coating composition may be applied by a method such as spin coating, slit coating, bar coating, spray coating, inkjet printing, or the like. However, the present invention is not limited thereto, and the hard coating composition may be applied by other methods.

As described above, the composition for a hard coating may include the polymer and the norbornene-based compound. The polymer and the norbornene-based compound may be mixed. In the step S210 of orienting the norbornene-based compound included in the hard coating composition, the hard coating composition applied on the base member BL and a solvent may be positioned within a vacuum chamber. Then, as the solvent is slowly added to the applied coating, e.g., by vapor diffusion, the norbornene-based compound may separate from the polymer and float atop the polymer. For example, the solvent may include a fluorine-based solvent. However, the step S210 of orienting the hard coating composition using the solvent is optional, that is, step S210 may be omitted.

In the step S220 of drying the hard coating composition, a solvent (e.g., a ketone-based solvent, an ether-based solvent, or an ester-based solvent) included in the hard coating composition may be removed. However, a portion of the solvent may remain or still be present in the composition following removal.

In the step S230 of curing the hard coating composition, the hard coating composition may be cured through light. In this case, the second layer 20 including the crosslinked structure formed by crosslinking the norbornene-based compound may be fixed to the first layer 10 including the crosslinked structure formed by crosslinking the polymer compound. Accordingly, the hard coating layer HC including the polymer compound and the norbornene-based compound may be formed on the base member BL. That is, the window member CW including the base member BL and the hard coating layer HC may be manufactured through the method of manufacturing the window member illustrated in FIG. 5.

Hereinafter, an experimental result of the hard coating layer HC included in the window member CW manufactured through the method of manufacturing the window member illustrated in FIG. 4 or the method of manufacturing the window member illustrated in FIG. 5 will be described.

Preparation of the First Monomer and the Second Monomer

Synthesis Example 1—Monomer Having a Perfluoroalkyl Group 1H,1H,2H,2H-heptadecafluorodecan-1-ol (1.829 g, 3.94 mmol), exo-5-norbornenecarboxylic acid (0.544 g, 3.94 mmol), and dimethylaminopyridine-tosylate (DMAP-TsOH) (0.116 g, 0.4 mmol) were dissolved in 8 mL of anhydrous tetrahydrofuran (THF). Then, dicyclohexylcarbodiimide (DCC) (0.813 g, 3.94 mmol) dissolved in 3 mL of anhydrous tetrahydrofuran (THF) was added dropwise at 0° C. The reaction mixture was stirred at room temperature. After 24 hours, the reaction mixture was cooled to 0° C. and a white precipitate was filtered off. The filtrate was concentrated with a rotary evaporator and purified with column chromatography to obtain a monomer having a fluoroalkyl group in a yield of about 80%.

Synthesis Example 2—Monomer Having a Hydroxyl Group

Diethylene glycol (0.938 g, 8.84 mmol), exo-5-norbornenecarboxylic acid (0.610 g, 4.42 mmol), and DMAP-TsOH (0.130 g, 0.4 mmol) were dissolved in 4 mL of anhydrous THF. Then, DCC (0.912 g, 4.42 mmol) dissolved in 3 mL of anhydrous THF was added dropwise at 0° C. The reaction mixture was heated to 80° C. and stirred. After 24 hours, the reaction mixture was cooled to 0° C. and a white precipitate was filtered off. The filtrate was concentrated with a rotary evaporator and purified by column chromatography to obtain a monomer having a hydroxyl group in a yield of 96%.

Synthesis Example 3—Monomer Having an Epoxy Group

Glycidol (0.160 g, 2.17 mmol), exo-5-norbornenecarboxylic acid (0.3 g, 2.17 mmol), and DMAP-TsOH (0.032 g, 0.234 mmol, 0.05eq) were dissolved in 3 mL of anhydrous THF. Then, DCC (0.447 g, 2.17 mmol) dissolved in 1 mL of anhydrous THF was added dropwise at 0° C. The reaction mixture was stirred at room temperature. After 20 hours, the reaction mixture was cooled to 0° C. and a white precipitate was filtered off. The filtrate was concentrated with a rotary evaporator and purified by column chromatography to obtain a monomer having an epoxy group in a yield of 55%.

Synthesis Example 4—Monomer Having an Epoxy Group 3,4-epoxy-1-(hydroxymethyl)cyclohexane (0.3 g, 2.34 mmol), exo-5-norbornenecarboxylic acid (0.323 g, 2.34 mmol), and DMAP-TsOH (0.689 g, 0.234 mmol, 0.1 eq) were dissolved in 4 mL of anhydrous THF. Then, DCC (0.48 3 g, 2.34 mmol) dissolved in 3 mL of anhydrous THF was added dropwise at 0° C. The reaction mixture was stirred at room temperature. After 24 hours, the reaction mixture was cooled to 0° C. and a white precipitate was filtered off. The filtrate was concentrated with a rotary evaporator and purified by column chromatography to obtain a monomer having an epoxy group in a yield of 93%.

Manufacture of the Window Member

Example 1—Polyurethane-Based Resin Base

Monomer having a hydroxyl group obtained through Synthesis Example 2 (0.225 g, 0.1 mmol) dissolved in 0.4 mL of THF was added dropwise to a solution in which Grubbs' 3rd generation catalyst (0.044 g, 5 µmol) was dissolved in a mixed solution of 0.7 mL of THF and 0.5 mL of ethyl nona-fluorobutyl ether, and the mixture was stirred at 0° C. for 15 minutes. Then, the monomer (0.233 g, 0.4 mmol) having a fluoroalkyl group obtained through Synthesis Example 1 dissolved in 0.4 mL of THF was continuously added dropwise and the mixture was stirred at 0° C. for 15 minutes to obtain a norbornene-based compound as a block copolymer having a bottle brush-type polymer structure. A hard coating composition was prepared by mixing 1.0 wt % of the prepared norbornene-based compound, 39.6 wt % of silica nanoparticles (Organosilicasol® dispersed in methyl ethyl ketone), 19.8 wt % of a polyol, and 39.6 wt % of hexamethylene diisocyanate (HDI).

The prepared hard coating composition was applied on a 5 cm×7 cm polyethylene terephthalate film by a bar coating method. For solvent orientation, this film was placed in a glass petri dish at room temperature along with a small petri dish containing 1,1,1,3,3,3-hexafluoro-2-propanol. A lid was added to close the petri dish and the dish was allowed to stand for a certain period of time. Then, the polyethylene terephthalate film coated with the prepared hard coating composition was cured with heat in an oven at 80° C. for 12 hours and a window member having a hard coating layer formed on the polyethylene terephthalate film was manufactured.

Example 2

Monomer having a hydroxyl group obtained through Synthesis Example 2 (0.113 g, 0.05 mmol) dissolved in 0.2 mL of THF was added dropwise to a solution in which Grubbs' 3rd generation catalyst (0.044 g, 5 µmol) was dissolved in a mixed solution of 0.7 mL of THF and 0.5 mL of ethyl nona-fluorobutyl ether, and the mixture was stirred at 0° C. for 15 minutes. Then, the monomer (0.263 g, 0.45 mmol) having a fluoroalkyl group obtained through Synthesis Example 1 dissolved in 0.536 mL of THF was continuously added dropwise and the mixture was stirred at 0° C. for 15 minutes to obtain a norbornene-based compound as a block copolymer having a bottle brush-type polymer structure.

A hard coating composition was prepared by mixing 1.0 wt % of the prepared norbornene-based compound, 39.6 wt % of silica nanoparticle (Organosilicasol® dispersed in methyl ethyl ketone), 19.8 wt % of polyol and 39.6 wt % of hexamethylene diisocyanate (HDI), and a window member was manufactured in the same method as in Example 1.

Example 3

Monomer having a hydroxyl group obtained through Synthesis Example 2 (0.056 g, 0.025 mmol) dissolved in 0.1 mL of THF was added dropwise to a solution in which Grubbs' 3rd generation catalyst (0.044 g, 5 µmol) was dissolved in a mixed solution of 0.7 mL of THF and 0.5 mL of ethyl nona-fluorobutyl ether, and the mixture was stirred at 0° C. for 15 minutes. Then, the monomer (0.276 g, 0.475 mmol) having a fluoroalkyl group obtained through Synthesis Example 1 dissolved in 0.594 mL of THF was continuously added dropwise and the mixture was stirred at 0° C. for 15 minutes to obtain a norbornene-based compound as a block copolymer having a bottle brush-type polymer structure.

A hard coating composition was prepared in the same method as in Example 1, and a window member was manufactured in the same method as in Example 1.

Example 4

A norbornene-based compound was obtained in the same method as in Example 1.

A hard coating composition was prepared by mixing 0.3 wt % of the prepared norbornene-based compound, 40 wt % of silica nanoparticles (ORGANOSILICSOL™ dispersed in methyl ethyl ketone), 32 wt % of a polyol, and 28 wt % of hexamethylene diisocyanate (HDI). A window member was manufactured in the same method as in Example 1, except that solvent orientation was not performed.

Example 5

A norbornene-based compound was obtained in the same method as in Example 1.

A hard coating composition was prepared in the same method as in Example 4, except that the content of the prepared norbornene-based compound was 0.3 wt %, and a window member was manufactured in the same method as in the example 1.

Example 6

A norbornene-based compound was obtained in the same method as in the example 1.

A hard coating composition was prepared in the same method as in Example 4, except that the content of the prepared norbornene-based compound was 0.5 wt %, and a window member was manufactured in the same method as in Example 1, except that solvent orientation was not performed.

Example 7

A norbornene-based compound was obtained in the same method as in Example 1.

A hard coating composition was prepared in the same method as in Example 4, except that the content of the prepared norbornene-based compound was 0.5 wt %, and a window member was manufactured in the same method as in Example 1.

Example 8

A norbornene-based compound was obtained in the same method as in Example 1.

A hard coating composition was prepared in the same method as in Example 4, except that the content of the prepared norbornene-based compound was 0.7 wt %, and a window member was manufactured in the same method as in Example 1, except that solvent orientation was not performed.

Example 9

A norbornene-based compound was obtained in the same method as in Example 1.

A hard coating composition was prepared in the same method as in Example 4, except that the content of the prepared norbornene-based compound was 0.7 wt %, and a window member was manufactured in the same method as in Example 1.

Example 10

A norbornene-based compound was obtained in the same method as in Example 1.

A hard coating composition was prepared in the same method as in Example 4, except that the content of the prepared norbornene-based compound was 1.5 wt %, and a window member was manufactured in the same method as in Example 1, except that solvent orientation was not performed.

Example 11

A norbornene-based compound was obtained in the same method as in Example 1.

A hard coating composition was prepared in the same method as in Example 4, except that the content of the prepared norbornene-based compound was 1.5 wt %, and a window member was manufactured in the same method as in Example 1.

Example 12

A norbornene-based compound was obtained in the same method as in Example 1.

A hard coating composition was prepared in the same method as in the example 4, except that the content of the prepared norbornene-based compound was 2 wt %, and a window member was manufactured in the same method as in Example 1, except that solvent orientation was not performed.

Example 13—Epoxy-Based Resin Base

Monomer having an epoxy group obtained through Synthesis Example 3 (0.194 g, 0.1 mmol) dissolved in 0.5 mL of THF was added dropwise to a solution in which Grubbs' 3rd generation catalyst (0.044 g, 5 μmol) was dissolved in a mixed solution of 0.5 mL of THF and 0.3 mL of ethyl nona-fluorobutyl ether, and the mixture was stirred at 0° C. for 15 minutes. Then, the monomer (0.2337 g, 0.4 mmol) having a fluoroalkyl group obtained through Synthesis Example 1 dissolved in 0.5 mL of THF was continuously added dropwise and the mixture was stirred at 0° C. for 15 minutes to obtain a norbornene-based compound as a block copolymer having a bottle brush-type polymer structure.

A hard coating composition was prepared by mixing 1.0 wt % of the prepared norbornene-based compound, 42.1 wt % of silica nanoparticle (Organosilicasol® dispersed in methyl ethyl ketone), 46.1 wt % of an epoxy organic/inorganic hybrimer represented by Chemical Formula 3, 9.8 wt % of a crosslinking agent represented by Chemical Formula 4, and a photoacid generator represented by Chemical Formula 5.

Chemical Formula 3

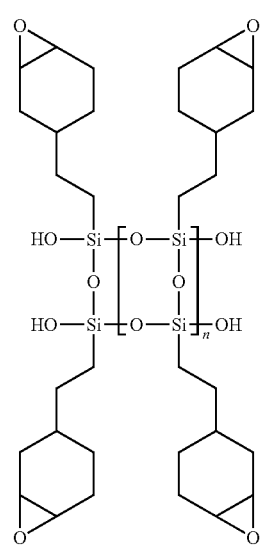

Chemical Formula 4

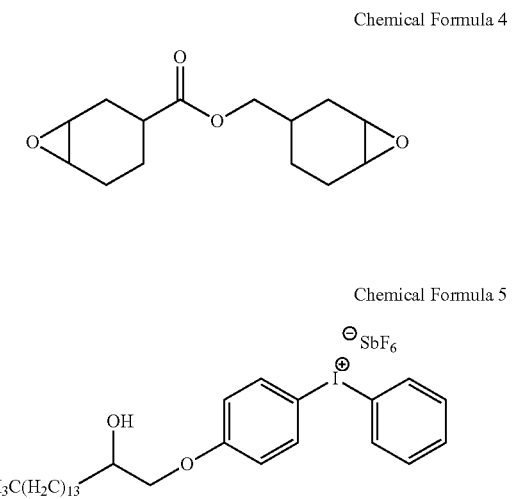

Chemical Formula 5

The prepared hard coating composition was applied on a 5 cm×7 cm polyethylene terephthalate film by a bar coating method. For solvent orientation, this film was placed in a glass petri dish at room temperature along with a small petri dish containing 1,1,1,3,3,3-hexafluoro-2-propanol. A lid was used to close the dish and the dish allowed to stand for 5 minutes. Then, the applied hard coating composition was dried at 60° C. for 1 minute to remove methyl ethyl ketone. The polyethylene terephthalate film coated with the prepared hard coating composition was placed in a photo reactor and cured through light for 5 minutes, and a window member having a hard coating layer formed on the polyethylene terephthalate film was manufactured.

Example 14

A norbornene-based compound was obtained in the same method as in Example 13.

A hard coating composition was prepared in the same method as in Example 13, and a window member was manufactured in the same method as in Example 13, except that solvent orientation was not performed.

Example 15

Monomer having an epoxy group obtained through Synthesis Example 4 (0.248 g, 0.1 mmol) dissolved in 0.5 mL of THF was added dropwise to a solution in which Grubbs' 3rd generation catalyst (0.044 g, 5 μmol) was dissolved in a mixed solution of 0.5 mL of THF and 0.3 mL of ethyl nona-fluorobutyl ether, and the mixture was stirred at 0° C. for 15 minutes. Then, the monomer (0.234 g, 0.4 mmol) having a fluoroalkyl group obtained through Synthesis Example 1 dissolved in 0.5 mL of THF was continuously added dropwise and the mixture was stirred at 0° C. for 15 minutes to obtain a norbornene-based compound as a block copolymer having a bottle brush-type polymer structure.

A hard coating composition was prepared by mixing 1.0 wt % of the prepared norbornene-based compound, 41.7 wt % of silica nanoparticle (Organosilicasol® dispersed in methyl ethyl ketone), 41.7 wt % of an epoxy organic/inorganic hybrimer represented by Chemical Formula 3, 16.7 wt % of a crosslinking agent represented by Chemical Formula 4, and a photoacid generator represented by Chemical Formula 5.

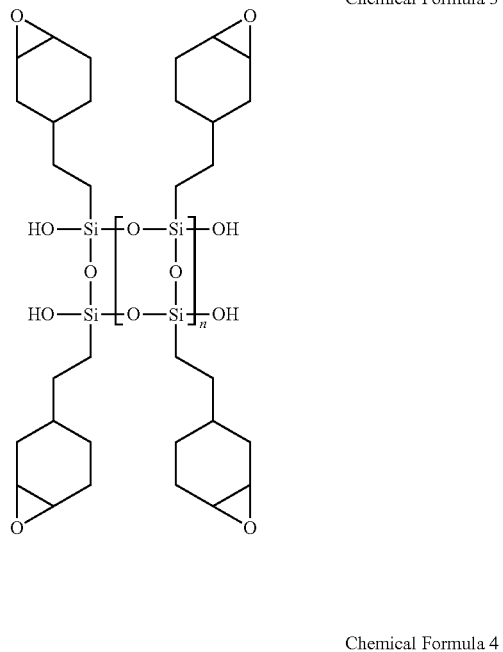

Chemical Formula 3

Chemical Formula 4

Chemical Formula 5

A window member was manufactured in the same method as in Example 13, except that solvent orientation was not performed.

Example 16

A norbornene-based compound was obtained in the same method as in Example 15.

A hard coating composition was prepared in the same method as in Example 15, except that the content of the prepared norbornene-based compound was 0.2 wt %, and a window member was manufactured in the same method as in Example 13, except that solvent orientation was not performed.

Example 17

A norbornene-based compound was obtained in the same method as in Example 15.

A hard coating composition was prepared in the same method as in Example 15, except that the content of the prepared norbornene-based compound was 0.5 wt %, and a window member was manufactured in the same method as in Example 13, except that solvent orientation was not performed.

Example 18

A norbornene-based compound was obtained in the same method as in Example 15.

A hard coating composition was prepared in the same method as in Example 15, except that the content of the prepared norbornene-based compound was 0.7 wt %, and a window member was manufactured in the same method as in Example 13, except that solvent orientation was not performed.

Example 19

A norbornene-based compound was obtained in the same method as in Example 15.

A hard coating composition was prepared in the same method as in Example 15, except that the content of the prepared norbornene-based compound was 1 wt %, and a window member was manufactured in the same method as in Example 13, except that solvent orientation was not performed.

Example 20

A norbornene-based compound was obtained in the same method as in Example 15.

A hard coating composition was prepared in the same method as in Example 15, except that the content of the prepared norbornene-based compound was 1 wt %, and a window member was manufactured in the same method as in Example 13.

Example 21

A norbornene-based compound was obtained in the same method as in Example 15.

A hard coating composition was prepared in the same method as in Example 15, except that the content of the prepared norbornene-based compound was 1.5 wt %, and a window member was manufactured in the same method as in Example 13, except that solvent orientation was not performed.

Example 22

A monomer having an epoxy group obtained through Synthesis Example 4 (0.062 g, 0.25 mmol) and a monomer having a fluoroalkyl group obtained through Synthesis Example 1 (0.234 g, 0.4 mmol) homogeneously dissolved in THF were added dropwise to a solution in which Grubbs' 3rd generation catalyst (0.044 g, 5 µmol) was dissolved in the mixed solution of 0.5 mL of THF and 0.3 mL of ethyl nona-fluorobutyl ether, and the mixture was stirred at 0° C. for 20 minutes to obtain a norbornene-based compound as a random copolymer having a bottle brush-type polymer structure.

A hard coating composition was prepared in the same method as in Example 15, except that the content of the prepared norbornene-based compound was 1.5 wt %, and a window member was manufactured in the same method as in Example 13, except that solvent orientation was not performed.

Example 23

A monomer having an epoxy group obtained through Synthesis Example 4 (0.248 g, 0.1 mmol) and a monomer having a fluoroalkyl group obtained through Synthesis Example 1 (0.234 g, 0.4 mmol) homogeneously dissolved in THF were added dropwise to a solution in which Grubbs' 3rd generation catalyst (0.044 g, 5 µmol) was dissolved in the mixed solution of 0.5 mL of THF and 0.3 mL of ethyl nona-fluorobutyl ether, and the mixture was stirred at 0° C. for 20 minutes to obtain a norbornene-based compound as a random copolymer having a bottle brush-type polymer structure.

A hard coating composition was prepared in the same method as in Example 15, except that the content of the prepared norbornene-based compound was 1.5 wt %, and a window member was manufactured in the same method as in Example 13, except that solvent orientation was not performed.

Example 24

A monomer having an epoxy group obtained through Synthesis Example 4 (0.031 g, 0.125 mmol) and a monomer having a fluoroalkyl group obtained through Synthesis Example 1 (0.073 g, 0.125 mmol) homogeneously dissolved in THF were added dropwise to a solution in which Grubbs' 3rd generation catalyst (0.022 g, 2.5 µmol) was dissolved in the mixed solution of 0.5 mL of THF and 0.3 mL of ethyl nona-fluorobutyl ether, and the mixture was stirred at 0° C. for 20 minutes to obtain a norbornene-based compound as a random copolymer having a bottle brush-type polymer structure.

A hard coating composition was prepared in the same method as in Example 15, except that the content of the prepared norbornene-based compound was 1.5 wt %, and a window member was manufactured in the same method as in Example 13, except that solvent orientation was not performed.

Example 25

Monomer having a hydroxyl group obtained through Synthesis Example 4 (0.031 g, 0.125 mmol) dissolved in 0.5 mL of THF was added dropwise to a solution in which Grubbs' 3rd generation catalyst (0.022 g, 2.5 µmol) was dissolved in a mixed solution of 0.5 mL of THF and 0.3 mL of ethyl nona-fluorobutyl ether, and the mixture was stirred at 0° C. for 15 minutes. Then, the monomer (0.073 g, 0.125 mmol) having a fluoroalkyl group obtained through Synthesis Example 1 dissolved in 0.5 mL of THF was continuously added dropwise and the mixture was stirred at 0° C. for 15 minutes to obtain a norbornene-based compound as a block copolymer having a bottle brush-type polymer structure.

A hard coating composition was prepared in the same method as in Example 15, except that the content of the prepared norbornene-based compound was 1.5 wt %, and a window member was manufactured in the same method as in Example 13, except that solvent orientation was not performed.

Example 26

A norbornene-based compound was obtained in the same method as in Example 15.

A hard coating composition was prepared in the same method as in Example 15, except that the content of the prepared norbornene-based compound was 1.5 wt %, and a window member was manufactured in the same method as in Example 13, except that solvent orientation was not performed.

Evaluation of the Hard Coating Layer Included in the Window Member

Pencil hardness, surface contact angle (°), thickness (μm), and surface roughness (Rq) of the hard coating layers prepared in examples 1 to 26 were measured.

First, the pencil hardness of the hard coating layers prepared in Examples 1 to 21 was measured using a horizontal pencil hardness tester. The pencils used for the measurement were Mitsubishi Uni pencil 6B to 9H. As the Uni pencil was loaded with a load of 0.75 Kg/lkg, the Uni pencil passed through the hard coating layer at an angle of 45°. The maximum HB type graphite grade that does not damage the hard coat layer was measured as the pencil hardness of the hard coat layer.

Referring to Table 1 below, the pencil hardness of the hard coating layers prepared in Examples 1 to 11 is B was confirmed, and the pencil hardness of the hard coating layer prepared in Example 12 is H was confirmed. In addition, referring to Table 2 below, the pencil hardness of the hard coating layers prepared in Examples 13 to 20 is B was confirmed, and the pencil hardness of the hard coating layer prepared in Example 21 is H was confirmed.

Then, the surface contact angle of the hard coating layers prepared in Examples 1 to 26 with respect to water was measured using a contact angle measuring instrument (CAX-150). The surface contact angle was measured by photographing a water droplet in which 10 μL of water was vertically dropped on the hard coating layer fixed horizontally. The picture of the water drop was taken with a USB digital microscope, and the surface contact angle of the hard coating layer with respect to water was measured using image analysis software of a computer.

Referring to Table 1 below, the hard coating layer prepared in Example 1 represents the highest surface contact angle among Examples 1 to 12 was confirmed.

TABLE 1

| Example No. | Pencil hardness | Surface contact angle (deg) | Thickness (μm) |
| --- | --- | --- | --- |
| Example 1 | B | 110 | 9 |
| Example 2 | B | 91 | 9 |
| Example 3 | B | 85 | 8 |
| Example 4 | B | 83 | 9 |
| Example 5 | B | 85 | 9 |
| Example 6 | B | 84 | 8 |
| Example 7 | B | 86 | 9 |
| Example 8 | B | 80 | 8 |
| Example 9 | B | 87 | 7 |
| Example 10 | B | 88 | 9 |
| Example 11 | B | 88 | 8 |
| Example 12 | H | 86 | 8 |

Referring to Table 2 below, the hard coating layers prepared in Example 13, Example 19, Example 21, Example 24 and Example 26 represents the high surface contact angle without solvent orientation was confirmed.

TABLE 2

| Example No. | Pencil hardness | Surface contact angle (deg) | Thickness (μm) |
| --- | --- | --- | --- |
| Example 13 | B | 108 | 9 |
| Example 14 | B | 106 | 7 |
| Example 15 | B | 70 | 9 |
| Example 16 | B | 85 | 9 |
| Example 17 | B | 85 | 8 |
| Example 18 | B | 98 | 9 |
| Example 19 | B | 110 | 8 |
| Example 20 | B | 110 | 7 |
| Example 21 | H | 110 | 9 |
| Example 22 | — | 97 | — |
| Example 23 | — | 101 | — |
| Example 24 | — | 110 | — |
| Example 25 | — | 80 | — |
| Example 26 | — | 110 | — |

Figure 6:
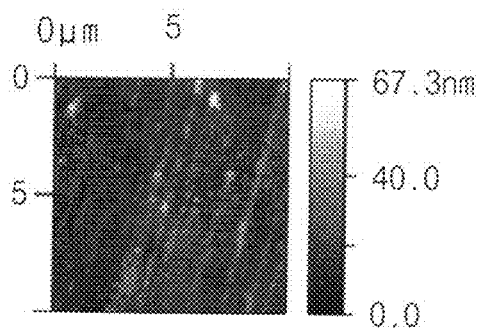
FIG. 6 is a view illustrating an image of a surface of a hard coating layer according to embodiments of Example 14, Example 15, Example 17, and Example 23.
Figure 6:
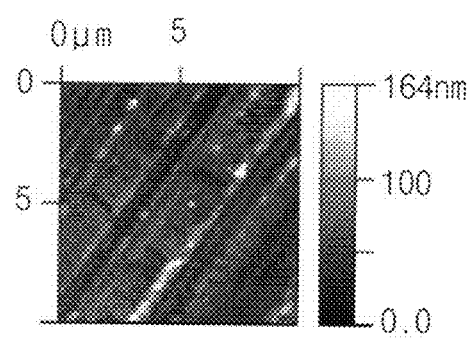
Figure 6:
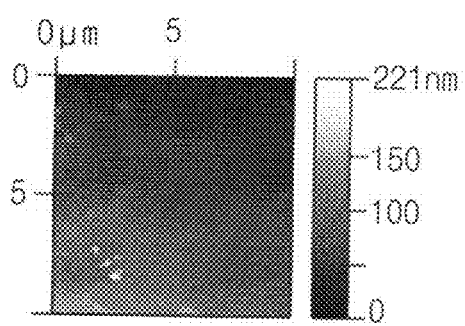
Figure 6:
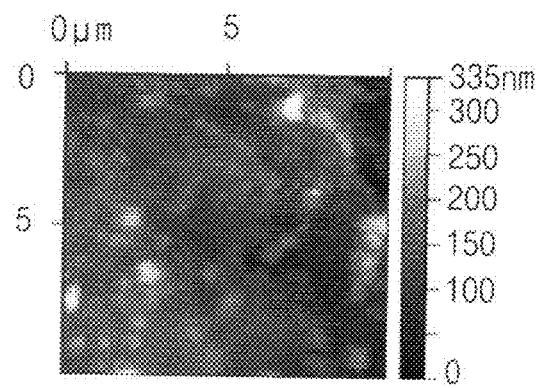

FIG. 6 is a view illustrating an image of a surface of a hard coating layer according to embodiments. Specifically, FIG. 6 illustrates images obtained by photographing an upper surface of the hard coating layer prepared in Example 14, Example 15, Example 17, and Example 23.

The surface roughness (Rq) of the hard coating layer was measured using the non-contact mode of atomic force microscopy (AFM). At this time, the atomic force microscope was used as SIS Nanostation II.

As a result, referring to FIG. 6 and Table 3 below, the surface roughness of the hard coating layer prepared in Example 14, Example 15, and Example 17 was relatively small, and the surface roughness of the hard coating layer prepared in Example 23 was relatively large was confirmed.

TABLE 3

| Example No. | Surface roughness (Rq) |
| --- | --- |
| Example 14 | 6.21 mm |
| Example 15 | 21.4 mm |
| Example 17 | 11.8 mm |
| Example 23 | 41.4 mm |

The present disclosure can be applied to various display devices that include a display device. For example, the present disclosure can be applied to high-resolution smartphones, mobile phones, smart pads, smart watches, tablet PCs, in-vehicle navigation systems, televisions, computer monitors, notebook computers, and the like.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A coating composition comprising:
a norbornene-based compound represented by Chemical Formula 1; and a polymer including at least one of an epoxy-based resin, a polyurethane-based resin, or an acrylic resin:

Chemical Formula 1

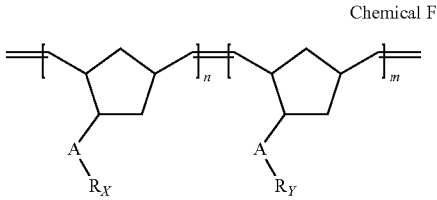

wherein in Chemical Formula 1, A represents an ester group, an ether group, an amide group, or an alkylene group, Rx represents a fluoroalkyl group or a fluoropolyether group, Ry represents an alkyl group having a crosslinkable functional group, and each of n and m is independently 1 to about 100, wherein the norbornene-based compound and the polymer are different.

2. The composition of claim 1, wherein the norbornene-based compound is a block copolymer or a random copolymer.

3. The coating composition of claim 1, wherein the norbornene-based compound has a bottle-brush polymer structure.

4. The coating composition of claim 1, wherein the norbornene-based compound is a product of ring opening metathesis polymerization of a first monomer having the crosslinkable functional group and a second monomer having the fluoroalkyl group.

5. The coating composition of claim 1, wherein the crosslinkable functional group is a hydroxyl group, an epoxy group, an acrylate group, or a methacrylate group.

6. The coating composition of claim 1, wherein the fluoroalkyl group is 1H,1H,2H,2H-heptadecafluorodecyl, 1,1,1,3,3,3-hexafluoroisopropyl, 1H,1H,3H-hexafluorobutyl, 1H,1H,3H-tetrafluoropropyl, 1H,1H,5H-octafluoropentyl, 1H,1H,7H-dodecafluoroheptyl, 1H,1H-heptafluorobutyl, or 2,2,2-trifluoroethyl.

7. The coating composition of claim 1, wherein in the norbornene-based compound, a mole ratio n:m of the compound represented by Chemical Formula 1 is about 95:5 to about 50:50.

8. The hard coating composition of claim 1, further comprising silica nanoparticles.

9. The coating composition of claim 8, further comprising a solvent, and a photoacid generator.

10. The coating composition of claim 9, wherein the composition includes the epoxy-based resin and a crosslinking agent.

11. The coating composition of claim 10, wherein the crosslinking agent has an epoxy group, and the photoacid generator has a fluoroalkyl group.

12. The coating composition of claim 9, wherein the photoacid generator has a fluoroalkyl group.

13. The coating composition of claim 9, wherein the solvent includes at least one of a ketone-based solvent, an ether-based solvent, or an ester-based solvent.

14. The coating composition of claim 1, wherein the composition includes the polyurethane-based resin and a solvent.

15. A window member comprising:
a base member; and
a hard coating layer disposed on the base member, the hard coating layer comprising a first layer and second layer disposed on the first layer,
wherein the first layer includes a cross-linked structure formed by curing a polymer including at least one of an epoxy-based resin, a polyurethane-based resin, or an acrylic resin, and
wherein the second layer includes a cross-linked structure formed by curing the composition of claim 1.

16. The window member of claim 15, wherein the first layer has a surface adjacent to the base member and the second layer is fixed to an opposite surface of the first layer.

17. The window member of claim 15, wherein the norbornene-based compound is a block copolymer or a random copolymer.

18. The window member of claim 15, wherein the norbornene-based compound is a product of a ring opening metathesis polymerization of a first monomer having the crosslinkable functional group and a second monomer having the fluoroalkyl group, and
wherein the norbornene-based compound has a bottle-brush polymer structure.

19. The window member of claim 15, wherein the crosslinkable functional group is a hydroxyl group, an epoxy group, an acylate group, or a (meth)acrylate group.

20. The window member of claim 15, wherein the fluoroalkyl group is 1H,1H,2H,2H-heptadecafluorodecyl, 1,1,1,3,3,3-hexafluoroisopropyl, 1H,1H,3H-hexafluorobutyl, 1H,1H,3H-tetrafluoropropyl, 1H,1H,5H-octafluoropentyl, 1H,1H,7H-dodecafluoroheptyl, 1H,1H-heptafluorobutyl, or 2,2,2-trifluoroethyl.

21. The window member of claim 15, wherein the base member includes a plastic.

* * * * *